UNITED STATES PATENT OFFICE.

JOHN JAMES HOOD AND ALFRED GORDON SALAMON, OF LONDON, ENGLAND, ASSIGNORS TO THE OIL REFINING IMPROVEMENTS COMPANY, LIMITED, OF GLASGOW, SCOTLAND.

TREATMENT OF MINERAL AND VEGETABLE OILS.

962,841.     Specification of Letters Patent.     Patented June 28, 1910.

No Drawing.     Application filed July 26, 1909. Serial No. 509,592.

*To all whom it may concern:*

Be it known that we, JOHN JAMES HOOD and ALFRED GORDON SALAMON, subjects of the King of Great Britain, both residing at 1 Fenchurch avenue, London, England, have invented new and useful Improvements in the Treatment of Mineral and Vegetable Oils, of which the following is a specification.

The object of the invention is to efficiently decolorize, and in some instances deodorize, for commercial purposes, crude oil whether mineral oil or vegetable oil, such for instance as cotton seed oil and wood oil, or the fractionated products thereof. This is effected by using as a filtering material for the crude or fractionated oil chemically precipitated alumina which has been very thoroughly washed dried and ignited below bright redness, *i. e.* to a dull red heat so as to render it practically anhydrous. When alumina is precipitated it appears in the trihydrate form, its formula being $Al_2O_3.3H_2O$ and these three molecules of water are removed by the heating. Further, in the event of commercial requirements demanding a cheaper material than the chemically precipitated alumina, it is found that highly satisfactory results can be obtained by employing bauxite (which is the natural equivalent of the above aluminium trihydrate). The mineral should be ground or pulverized to a condition which tests show to be the most suitable for the particular oil to be operated on and then sufficiently heated at a dull red heat. The heating should in all cases be of such duration that the alumina may be thereby rendered practically anhydrous. Moreover in order to obtain the maximum of efficiency of the filtering material it is desirable to protect it as far as possible from atmospheric influence after heating until such time as it is brought into contact with the oil. The efficiency of the bauxite for the aforesaid purpose varies very greatly with its physical condition as well as its chemical composition, in other words upon the extent to which it consists of pure aluminium trihydrate. Thus it is found that certain bauxites of a deep red color, which might be suitable for the manufacture of aluminium or of alumina for other industrial purposes, are quite unsuitable or very inefficient for this purpose, and the bauxites which yield the best results are generally gray and soft and slightly greasy to the touch when rubbed and consist generally of fairly pure aluminium trihydrate.

In order to secure success in the employment of bauxite as a filtering material for oil it is necessary to proceed by way of selection and this can best be effected by making preliminary experiments upon a small laboratory scale. Some bauxites however which do not favorably respond to this laboratory test can be caused to do so by treatment with a small proportion of alkali, preferably lime water, before ignition, and others can be satisfactorily treated previous to ignition by moistening with a dilute acid, preferably hydrochloric. Should it be decided to employ a bauxite treated by either of the above methods, it follows that the material to be used upon the large scale must be treated in a manner corresponding to that adopted upon the laboratory scale with satisfactory results. It is of course obvious that any other mineral which will furnish suitable alumina may be substituted for bauxite.

The amount of oil that can be passed through a given weight and volume of the filtering material will vary with the commercial requirements in respect of the color of the oil, but it is found that satisfactory results can be obtained by using a series of two or more filtering vessels, and ultimately using the last or catch vessel as the first vessel of the series, but we do not restrict ourselves to this method of employing the material. When the material is no longer satisfactory it can generally be again fitted for use by distilling off the absorbed oil, driving it out with steam or washing it out with light petroleum ether according to circumstances and then igniting for a suitable time at a dull red heat.

In treating thick dark viscid oils, such as the fractions intended for lubricating purposes or crude cotton seed oil, we proceed as follows: The viscid oil is dissolved in a suitable volume of light petroleum spirit, such volume being determined for each particular dark oil experimentally, and the solution is passed through the filtering medium. The latter is then washed with such spirit, and the resulting filtrate and washings distilled; such distillation may be carried on continuously, the filtrate being run in a continuous stream from the filters to the still. The light spirit so used is collected and may be used again for similar purposes.

It is found that generally the lower the boiling point of the spirit the greater its efficiency, and also that generally a light spirit which reacts to any marked extent when treated with bromin is not so efficient as one that will not readily react with bromin. Without attempting to describe the theory underlying these observations we desire to point out that as the result of experiments a considerable variation is found in the efficiency of available light spirits and therefore it is necessary to make a preliminary test of the light spirit by mixing it with the oil to be treated and passing the mixture through the filtering material. The selection of the light spirit for efficient use, should depend upon the results thus obtained.

What we claim is:—

1. The process hereindescribed of decolorizing oil which consists in filtering it through alumina prepared by heating aluminium trihydrate and thus rendering it anhydrous.

2. The process hereindescribed of decolorizing oil which consists in dissolving it in light petroleum spirit, filtering the solution through alumina prepared by heating aluminium trihydrate to render it anhydrous and distilling the filtrate.

JOHN JAMES HOOD.
ALFRED GORDON SALAMON.

Witnesses:
R. B. RANSFORD,
H. J. LEWIS.